(12) United States Patent
Khanzode et al.

(10) Patent No.: US 9,477,935 B2
(45) Date of Patent: Oct. 25, 2016

(54) TIMELINE BASED VISUAL DASHBOARD FOR CONSTRUCTION

(71) Applicant: DPR Construction, Redwood City, CA (US)

(72) Inventors: Atul Khanzode, Sunnyvale, CA (US); John Vardman, Sunnyvale, CA (US); Howard Steve Spence, Danville, CA (US); Daniel Gonzales, Oakland, CA (US)

(73) Assignee: DPR CONSTRUCTION, Redwood City, CA (US)

( * ) Notice: Subject to any disclaimer, the term of this patent is extended or adjusted under 35 U.S.C. 154(b) by 372 days.

(21) Appl. No.: 13/749,563

(22) Filed: Jan. 24, 2013

(65) Prior Publication Data

US 2014/0207512 A1    Jul. 24, 2014

(51) Int. Cl.
*G06Q 10/06*    (2012.01)

(52) U.S. Cl.
CPC .............................. *G06Q 10/06312* (2013.01)

(58) Field of Classification Search
None
See application file for complete search history.

(56) References Cited

U.S. PATENT DOCUMENTS

| | | | |
|---|---|---|---|
| 2006/0242419 A1* | 10/2006 | Gaffey | G06Q 10/06 713/176 |
| 2009/0174768 A1* | 7/2009 | Blackburn | G06F 17/30244 348/130 |

* cited by examiner

*Primary Examiner* — Matthew Gart
*Assistant Examiner* — Ashley Y Young
(74) *Attorney, Agent, or Firm* — Kilpatrick Townsend & Stockton LLP

(57) ABSTRACT

An embodiment of the invention includes a computer implemented method for monitoring construction. The method may include receiving information about a construction project. The received information may include information about construction milestones and schedule information about the construction milestones. The information may include graphical data related to the construction milestones and the schedule information. Information about the location of a computing device may be received. Based on the location information and the information about the construction project, a graphical display user-interface may be prepared. In an embodiment of the invention, the display may include a visual representation of expected progress of the project. The display may include information about expected activity related to the project for a period of time. Embodiments include receiving an indication from a user that the representation of the expected progress differs from actual progress of the project and determining revised information about the construction project.

22 Claims, 8 Drawing Sheets

TIMELINE BASED VISUAL DASHBOARD FOR CONSTRUCTION

STATEMENT AS TO RIGHTS TO INVENTIONS MADE UNDER FEDERALLY SPONSORED RESEARCH AND DEVELOPMENT

Not Applicable

BACKGROUND OF THE INVENTION

Construction projects may involve complex logistics, schedules and milestones. For example, a project may involve offsite production of a number of custom components off-site, and delivery of custom and standard materials and components to the construction site at various times. The deliveries must be coordinated with activity on the construction site, in order to ensure that deliveries from different suppliers are coordinated, and to ensure that components neither arrive before or after they are scheduled to, and that people are on site to work with materials as they arrive.

When one or more parts of a construction projects is behind schedule, there may be a need to reschedule other parts of the project, to ensure that there is sufficient storage space, and to ensure that unnecessary cost is not spent on people or other materials that cannot be used until certain project stages are completed. Furthermore, distribution of human, fiscal and other resources may be redistributed to ensure that the project is executed in the necessary order.

Tracking the progress of the various parts of a construction project may be an expensive and labor intensive task involving tracking the progress of a project and the use of labor, materials and money can be slow. It can be difficult to interpret the information received and correlate it with a project plan. Processing the available information may crucially delay invaluable information about project progress, which if available early can enable action to be taken to bring a delayed project back on schedule.

Therefore, there is a need in the art for improved methods and systems for collecting and processing information about a construction project.

SUMMARY OF THE INVENTION

An embodiment of the invention includes a computer implemented method for monitoring construction. The method may include receiving information about a construction project. The received information may include information about construction milestones and schedule information about the construction milestones. Furthermore, the information may include graphical data related to the construction milestones and the schedule information.

In an embodiment of the invention, information about the location of a computing device is received. Based on the location information and the information about the construction project, a graphical display user-interface may be prepared. In an embodiment of the invention, the display may include a visual representation of expected progress of the project. The display may further include information about expected activity related to the project for a period of time.

Embodiments of the invention include receiving an indication from a user that the representation of the expected progress differs from actual progress of the project and determining revised information about the construction project.

In an embodiment of the invention, schedule information may include information about expected construction activity. Expected construction activity may include: equipment in use at a particular time; and materials used at a particular time.

In an embodiment of the invention, schedule information may include: a number of persons present at a particular time; money spent by a particular time; and man hours worked by a particular time.

In an embodiment of the invention, location information for a computing device may include GPS coordinates of the computing device. Location information may also include an indication from a user on a touch screen.

In an embodiment of the invention, a visual representation of the expected progress of the project may include a Gantt chart. Such a visual representation may also include a three-dimensional graphical representation of the expected appearance of the construction site. The three-dimensional representation may further include indicators showing differences between the actual progress of the construction site and the expected progress of the construction site.

An embodiment of the invention includes receiving additional information about the actual progress of the project. Information about the actual project of the project may include: financial projections; data from an access card system; data from a vehicle tracking device; logistical tracking data; and imaging data.

Numerous benefits are achieved by way of the present invention over conventional techniques. For example, embodiments of the present invention provide means for collecting and processing information about a construction project, as well as means for presenting it in quickly and comprehensively in a succinct manner. These and other embodiments of the invention along with many of its advantages and features are described in more detail in conjunction with the text below and attached figures.

DETAILED DESCRIPTION OF THE INVENTION

Construction project may range from small projects such as painting a room or installing a projector to large scale projects such as constructing a whole building, campus or area. These project are of course vastly different in scope and complexity, but also have aspects in common. They may involve multiple tasks, people, money, resources and more. The more complex the construction project, the more variables are involved in ensuring that it is completed as planned and on time. Monitoring the execution of a construction project and comparing actual activity to the planned activity can expose differences between actual and planned progress at an early stages. Such differences may include delayed deliveries, over-spending, staff shortages, delayed execution, and a number of other factors. Discovering such differences early can help minimize the impact on the project, and enable action to bring the project back on track to be taken quickly.

Logistics are a significant part of many construction projects. In the most conventional form, logistics involves the delivery of materials to a construction site. Such materials may include construction materials such as concrete, lumber and fasteners but also more complex components such as faucets, pipes, electrical switches and the like. Logistics may also include coordinating off-site construction of custom components. For example, segments of walls may be constructed off-site and be delivered to the construction site when needed. Similarly, custom components such as pipes, electrical boards, and windows may be manufactured off site. It is important to ensure that these components are not only produced on time, but also delivered to the construction site on time. Many computer systems provide access to detailed logistical data both about the production as well as the delivery of custom and prefabricated components. Such data may be used to determine at an early stage when a delay in delivery may impact the construction project and what action can be taken.

Figure 1:
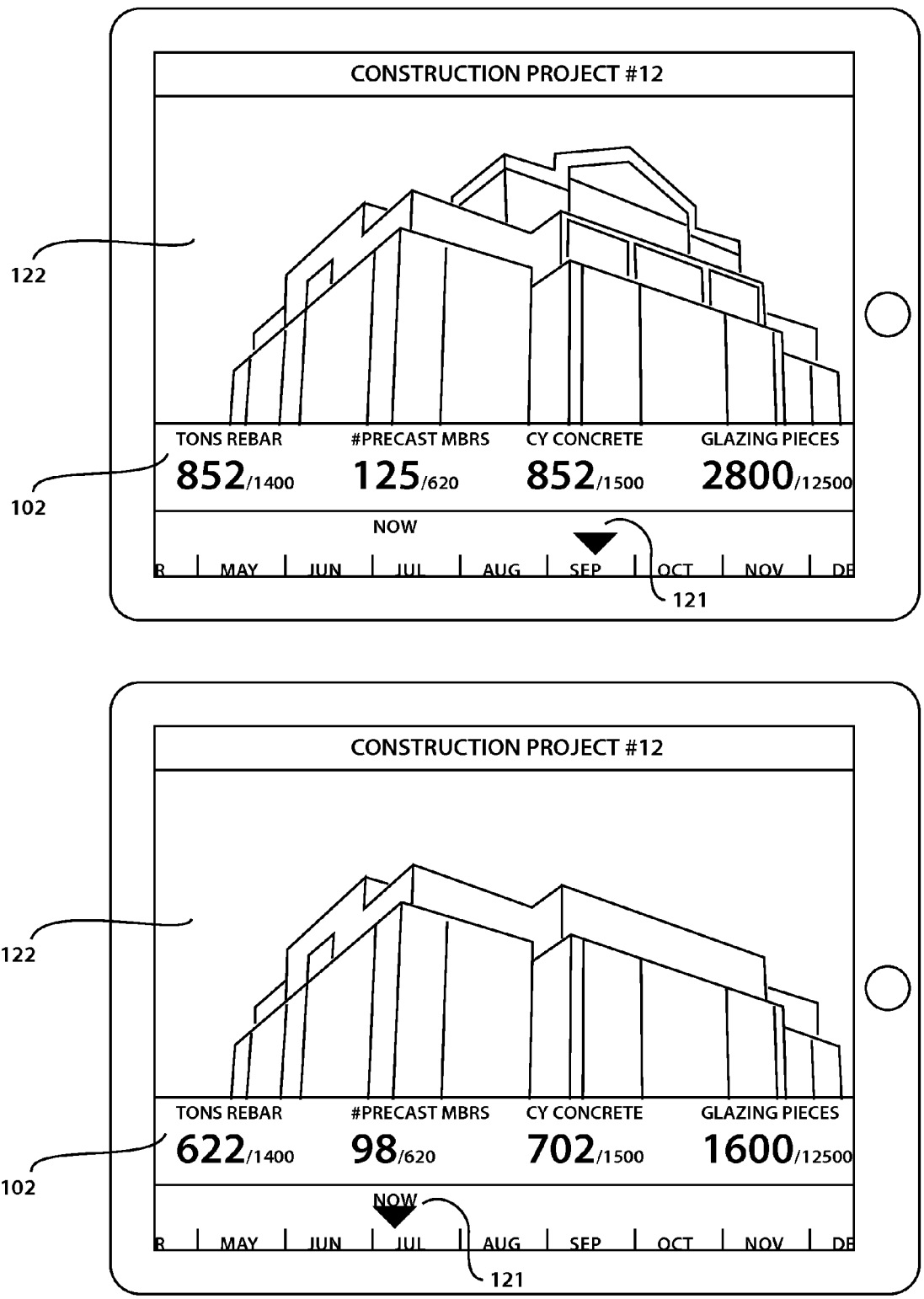
FIG. 1 shows an embodiment of the invention displaying a rendering of a construction project at two different stages.

Similarly, logistics may involve activity on the construction site. For example, a construction project may need 5000 light switches and 1000 electrical fuses. These may be delivered in one batch from a single supplier. Once the delivery reaches the construction site it may be divided into smaller bundles as they are needed at various locations around the construction site. In an embodiment of the invention, the receipt of the main shipment as well as, bundling and transport of the smaller bundles may be tracked to provide additional logistical data. FIG. 1 shows an embodiment of the invention including a graphical display including aggregated logistical data. For example, 101 shows a summary of materials actually delivered to the construction site at the present time and used as well as the expected total amounts. 102 shows a summary of materials expected delivered to the construction site at a future date.

Logistical data may be available from a number of sources and computer systems. Such systems may include the computer systems of large logistical companies such as UPS and FedEx. Embodiments of the invention may also use data from smaller companies, including for example an in-city courier such as Addison Lee of London. Furthermore, logistical data and production data may be available from a number of suppliers and manufacturers. All of this data may be available in different formats from different computer systems. In an embodiment of the present invention, the data may be correlated and aggregated with information about a construction project plan. A module may be used to fetch or receive logistical data from various sources and congregate it in a single location or a single format. This may include storing all the information in a single database. In another embodiment of the invention it may involve translating various logistical data packets into a common format and relaying it further. There are a number of ways of congregating such data, and a person skilled in the art will appreciate that the present invention is not limited to the examples cited above.

Embodiments of the invention include computer implemented methods for monitoring construction. The methods may be implemented on a number of different types of computing devices. In an embodiment of the invention, a desktop or a laptop computer is used. In another embodiment of the invention, a mobile device is used. Mobile devices may include a vast array of different devices, ranging from mobile phones to specialized custom computers. Some examples of mobile devices include a portable digital assistant (PDA), an Apple iPhone, a Samsung Galaxy S phone, an Apple iPad or a Motorola Xoom tablet.

The computing device may include a memory, such as random access memory (RAM); persistent storage, such as a hard drive or flash memory; a central processor (CPU); and a network interface. The network interface may include a network card, such as a wired Ethernet card or a wireless ethernet card (WiFi), a cellular modem, such as a CDMA, WCDMA or LTE modem; or another means of communicating over a network. The computing device may include a number of other components that are customary in a computing device. A person skilled in the art will be familiar with those components.

In another embodiment of the invention, a distributed computing device may be used. A distributed computing device may comprise one or more computers connected via a computer network. The computers may include servers, virtualized computers, mobile devices and any other type of computing device. The computer network may include the internet, a corporate network, a cellular network, or any other type of network.

The computing device may be capable of running applications. The applications may include apps downloaded from an app store, applications preloaded onto the device, or code sent over a network as it is needed, such as HTML and JavaScript. Apps from an app store may include apps downloaded from the Apple App Store, or the Google Play store. Apps may similarly be pushed to the computing device using a corporate server. An embodiment of the invention is implemented on an app running on the device. A person skilled in the art will appreciate that the scope of the invention is not limited to these examples, and that the invention can be practiced with a number of different means of executing code on the computing device, or on a device with which the computing device communicates over a network. FIGS. 1 through 5 show various embodiments of the invention running as apps on tablet computers.

In an embodiment of the invention, information about a construction project is received on the computing device. The information may be preloaded using a cable connected to another computer such as a USB cable, or it may be transmitted over a computer network. The information about the construction project may include any information relevant to the construction project. In an embodiment of the invention, a three dimensional model of the construction project is included. The model may include a model of the intended final outcome of the project, as well as a model of the construction site before the project commences. In embodiments of the invention, the model includes information indicating a time of expected completion for one or more of the components of the model of the final state of the project. In another embodiment, one or more models of interim states of the construction project may be included. For example, a model may describe a particular state expected of the project for a particular date.

Furthermore, the information about the construction project may include information about construction milestones and schedule information about the construction milestones. Construction milestones may include information about the place and time of any construction activity. In one embodiment, a construction milestone may include delivery information for materials for a particular part of the project. For example 10 tonnes of cement shall be delivered to site A. construction milestones may also include status on tasks including assembly or installation of components. For example installation of lighting fixtures on a floor of a building may be a construction milestone. In an embodiment of the invention, a construction milestone may include information about personnel present at a particular place at a particular time. Furthermore, a construction milestone may include having spent a particular amount of money, or having spent no more than a particular amount of money. Construction milestones may be grouped together an/or organized in a hierarchical manner. A person skilled in the art will appreciate that the examples recited above are merely a few examples of the various construction milestones that may be used in conjunction with an embodiment of the invention.

Figure 3:
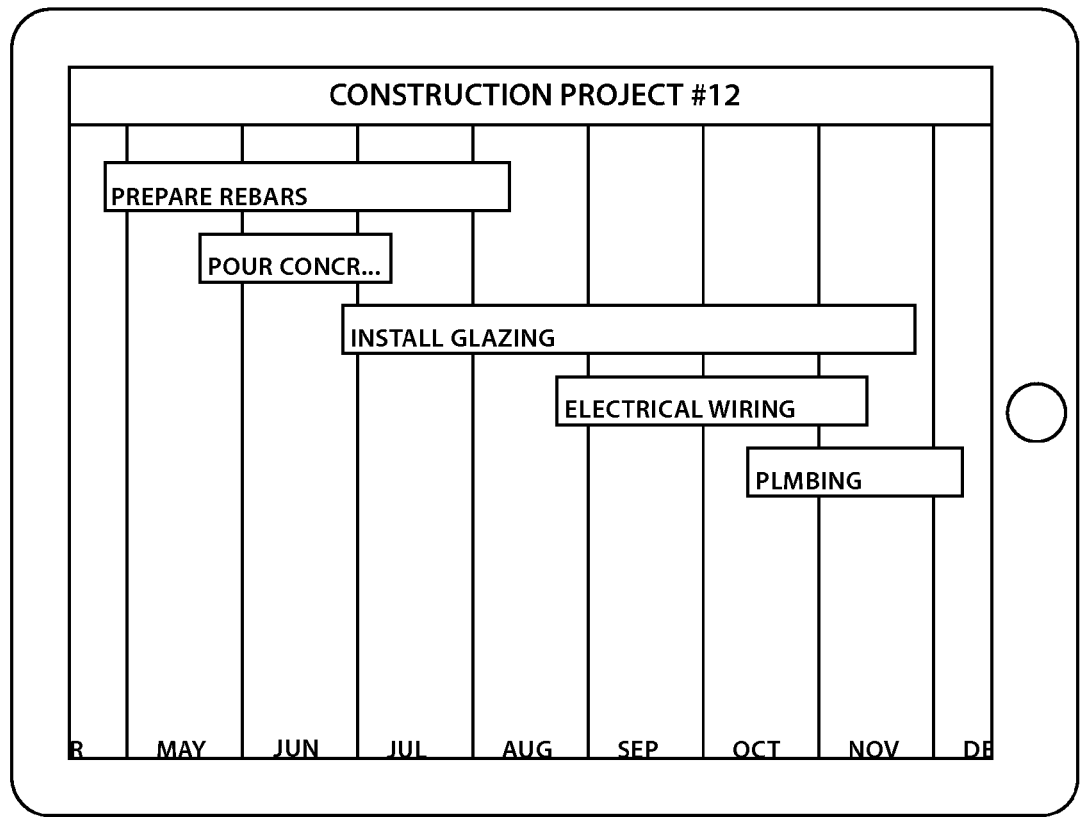
FIG. 3 shows an embodiment of the invention including a Gantt diagram providing information about construction project milestones and scheduling information relating to the milestones.

Scheduling information may be available for construction milestones. Scheduling information may include a particular date and time for the completion of the construction milestones. In an embodiment of the invention, scheduling information may be available for various stages of a construction milestone. In one embodiment of the invention, a time may be available for work start for a milestone, various other times may be available for intermediate steps, and another time is available for the completion of the milestone. For example, one milestone may be the delivery of 1000 tons of concrete to the construction site. The scheduling information may include a shipping date for the first batch of concrete, shipping dates for subsequent batches, a delivery date the first and subsequent batches, and a delivery date for the final batch. FIG. 3 shows a Gantt chart displaying a number of construction milestones, including an indication of a start date and an end date for each milestone.

Figure 4:
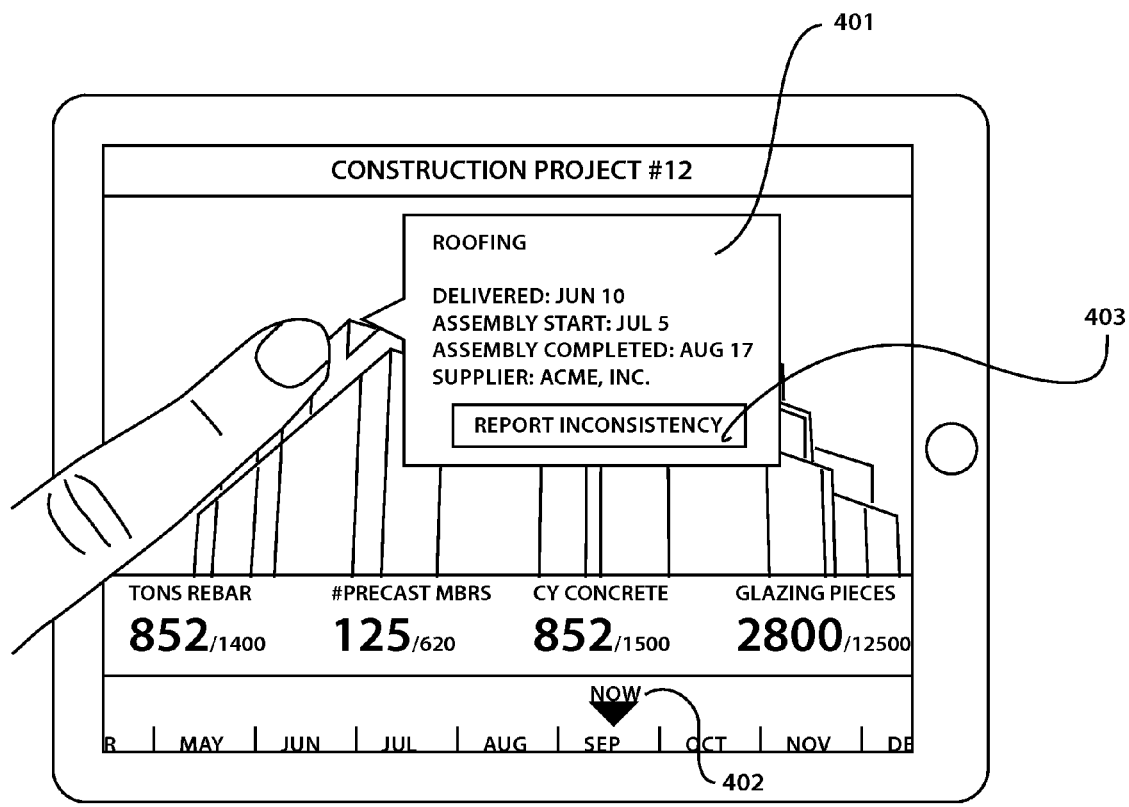
FIG. 4 shows an embodiment of the invention displaying information about a component of a construction project selected by a user by a touch-indication.
Figure 5:
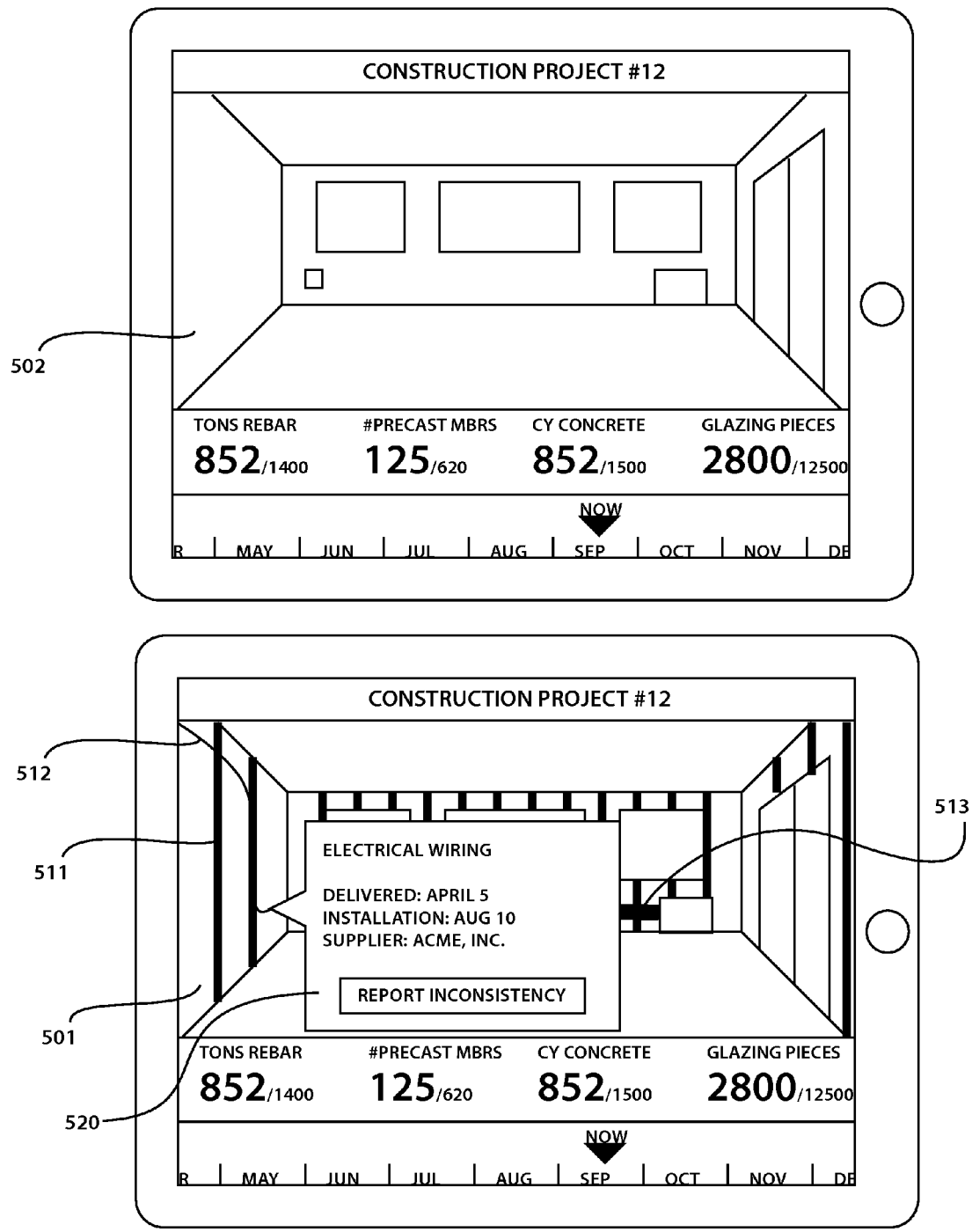
FIG. 5 shows an embodiment of the invention displaying two views of a room in a construction project. One view shows interior views of the walls in the room; one view shows exterior view of the walls in the room.

Furthermore, in an embodiment of the invention, the information about the construction project may include graphical data related to the construction milestones and the schedule information. The graphical information may include renderings of the three dimensional model of the construction project. FIGS. 1, 2, 4 and 5 include renderings of a three dimensional model. FIG. 1 shows renderings of two different stages of the construction project. 111 shows a rendering of the construction project at the present time. 112 indicates that the rendering shown is for the present time (July). 122 shows a rendering of the construction project at a future time; 121 indicates that the rendering shown is for a future time (September). In an embodiment of the invention a user can move the indicator using touch input to change the time for the rendering. The rendering may then be updated based on the user input. In an embodiment of the invention, the new rendering is generated on the fly by the computing device; in another embodiment, the user input is used to select a rendering already on the computing device; in yet another embodiment, the user input is used to send a request to a server for an appropriate rendering, the server may send a pre-generated rendering to the computing device, or generate a new rendering. Such renderings may include renderings of only parts of the model in order to expose structural elements, internal spaces, wall-interiors, a subset such as a room, or other parts of the project. FIG. 5 shows a rendering of a room in a construction project. 502 is a rendering of the expected final appearance of the room. 501 is a rendering showing the internals of the walls of the room, including support beams 511, electrical wiring 512, and air ducts 513. The renderings may be highlighted based on when activity is expected for a particular part of the model. The renderings may further include information about expected construction milestones, such as workers present at a particular place. FIG. 4 shows a rendering of a three dimensional model in an embodiment of the invention where the user has selected a roof in the model for additional information. A pop-up 401 showing additional information about the roofing is displayed. The additional information includes a delivery date, an assembly start date, an assembly completion date, and a supplier of the materials. The time indicator 402 on the display indicates that all the deadlines are past and that the roofing is expected to be installed. Had the user moved the time indicator to a future date, he may be able to see components that are not yet installed, and information about their respective milestones and scheduling information. Furthermore, the graphical information may include charts relating to construction milestones or construction information. The charts may include charts relating to the progress of particular tasks, the number of tasks completed on time. FIGS. 1, 2, 4 and 5 show embodiments of the invention including displays of aggregated data about the progress of various parts of a construction projects. In other embodiments, the displays may include bar-charts, pie charts or other graphical representations of similar data. Furthermore, in an embodiment of the invention, the graphical information includes Gantt charts showing various activity related to the project. FIG. 3 shows an embodiment of the invention including such a Gantt chart. The graphical information may further include animations.

The graphical information may be provided in a format that is ready to display to a user of a computing device, or in a format that can be easily modified or compiled locally on a portable computing device. In an embodiment of the invention, the graphical information includes a number of image files, such as JPEG, PNG of SVG images. The images may include some images that are ready to display to a user of the device; the images may also include images rendered to be overlaid onto another image. For example, the images may include a number of layers for a particular rendering. In an embodiment of the invention, one image includes a rendering of various structural elements of a building, a second image includes an image to be overlaid onto the first image that shows the exterior of the building, and a third image to be overlaid onto the other two showing expected activity. In another embodiment of the invention, there may be a single version of the bottom image, and then multiple versions of the images corresponding to other layers. For example, there may be four versions of the activity overlay corresponding to different stages of the project. Using pre-rendered images as described above may be advantageous when using the invention on a mobile device with limited ability to render three dimensional models or on devices with limited network bandwidth. Furthermore, it may be useful when it is undesirable to transmit three dimensional model information to the computing device. For example, it may be undesirable to transmit a comprehensive model to a computing device used by a third party contractor.

In an embodiment of the invention, the computing device may render animations or video based on the model. The animations may include a flyover or other view of the model. Furthermore, the animation may include a time-lapse or display of actual or expected progress of the project. In yet another embodiment of the invention, the animations may include animated charts, including a bar showing how much of the expected cost of the project has been spent, or what portion of expected deliveries to the construction site have been made. Furthermore, the computing device may present a slider-interface to the user allowing the user to create scenarios. For example, a slider may allow the user to specify an amount of time a particular event is delayed by, and the computing device may then update the display of project progress based on the specified value. FIG. 4 shows an interface displaying additional information about scheduling information for a roofing structure. The interface includes the ability to report an inconsistency such as a delay by pressing the "Report Inconsistency" button 403.

Similarly to the pre-rendered images described above, the graphical information may include pre-rendered video, or both pre-rendered video and images. Just as with the images, video may also be layered, and pre-rendered videos may be composited with other pre-rendered videos and/or images.

Figure 2:
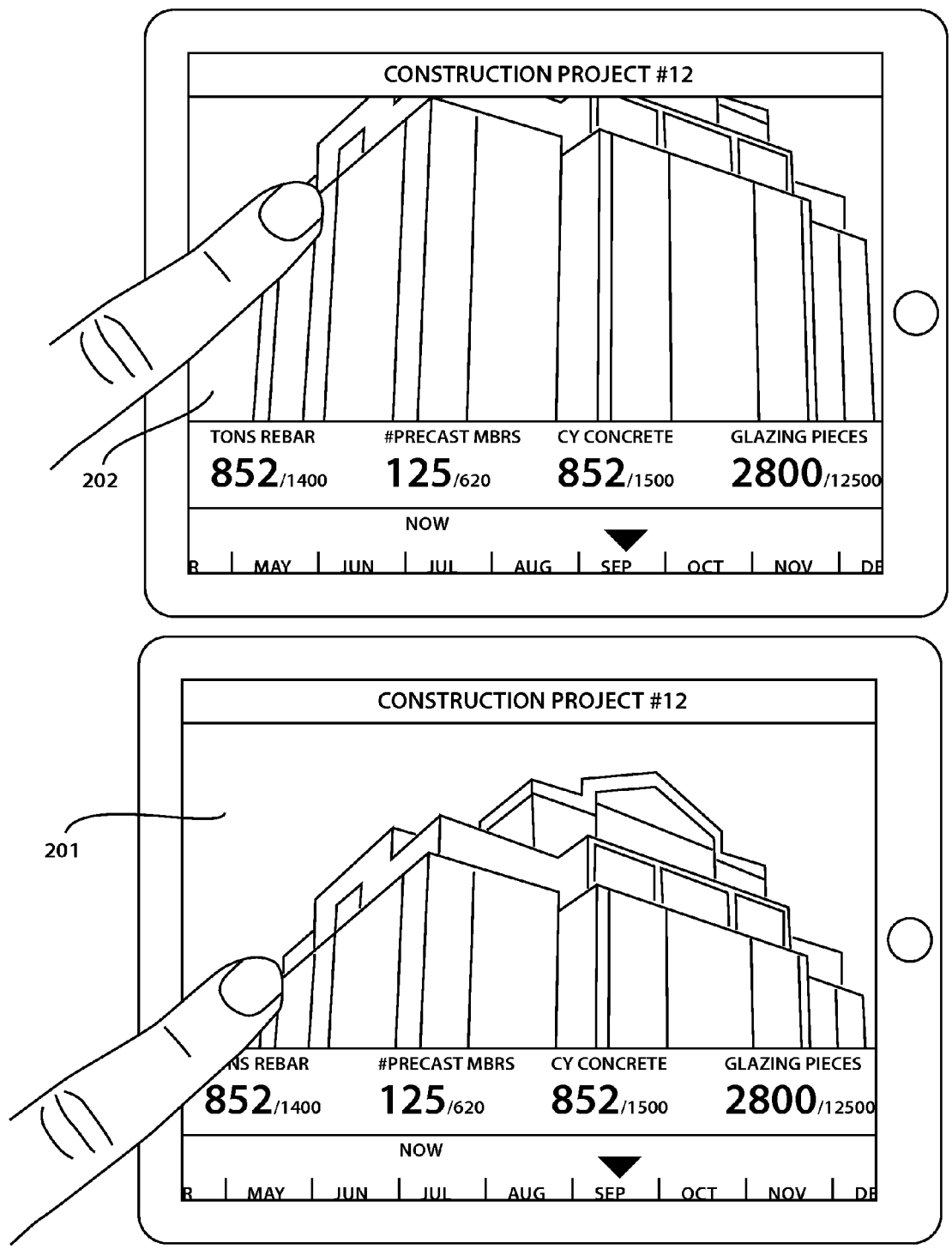
FIG. 2 shows an embodiment of the invention displaying two different perspectives of a rendering of a construction project based on touch-input from a user.

In another embodiment of the invention, a three dimensional model may be transmitted to the computing device for rendering. The model may for example be rendered on the computing device to provide a view of expected progress and activity to a user of the device. Depending on the computing power of the device, the model may include information only relating to a particular part of the construction project, or the model may include only certain types of information. In an embodiment, a model showing only the steel structure of a building is used. When a three-dimensional model is used, the device may generate both video and images from the model for display to the user. Furthermore, in an embodiment of the invention, the user may be able to generate animations of the model on the fly when the user touches the screen of the computing device. FIG. 2 shows a three dimensional rendering of a construction project and a user altering the perspective of the rendering using touch input. FIG. 2 includes a first stage of the rendering 201, and a second stage of the rendering after touch input by the user including a different perspective 202. In another embodiment, the point of view presented to the user may change based on touch input. Furthermore, touch input may be used to change the stage of the construction.

The three dimensional model may include reference points allowing the computing device to include additional information from other sources, such as information about current construction activity or logistical activity. In an embodiment of the invention, the user can select certain elements to focus on. For example, the user may be able to select a component from the model to view additional information about it. The user may select a wall, and then receive additional information about the components making up the wall, and the scheduled process for constructing the wall. In an embodiment of the invention, additional model information may be requested for the wall once it has been selected. FIG. 5 shows a rendering of a construction project where the user has requested additional information about electrical wiring. A display with additional information about the electrical wiring 520 is shown. This information may be transferred to the computing device over a wireless network. The additional information may further include a list of stock components comprising the wall, such as piping, electrical wiring and panels.

Allowing the computing device to progressively download more detailed model information as it is needed may allow for faster access over certain types of network connections, and may allow the invention to be used with computing devices with limited storage or computing power. Furthermore, it may allow the use of a model with more detailed information as it may be possible to access the model without downloading the entire model.

In an embodiment of the invention, the model may include interactive elements such that a user of the computing device can interact with the model. In an embodiment, the user may be able to conduct what-if scenarios to determine how something may affect the construction project. For example, the user may select an activity, such as a delivery of materials, and specify that it will be delayed by a week, and see the effects of the delay. In another embodiment, the model may permit the user to make changes to the project, such as cancelling a part of the project.

In an embodiment of the invention, information about the location of a computing device is received. When a mobile computing device such as a phone or tablet is used to display information about the construction project, a location sensor in the computing device may be used to determine its location. The location sensor may be a GPS og GLONASS receiver. The location of the device may also be determined based on signals from one or more WiFi access points. In an embodiment of the invention, the location may be triangulated based on the strength of the signal from a number of WiFi access points. Furthermore, a gyroscope may be used to determine the orientation and precise location of the device. Other means such as sound detection, or image detection may also be used.

The location information may comprise particular GPS coordinates for the location of the computing device. The information may also comprise information about a particular item that is close to the device, such as an identification number for a QR code label that was scanned by a camera on the device or a unique identifier associated with a sound recorded by a microphone attached to the device. In yet another embodiment of the invention, the user of the device may specify the location of the device by selecting a location from a map or list on the device.

The location of the device may be used to determine a particular view of a model of the construction project. For example, a view may be presented from the perspective of the location of the computing device. Furthermore, activities related to the particular location of the computing device may be highlighted.

In an embodiment of the invention, location information from a second computing device is used instead of or in addition to location information from the first computing device. For example, a computing device may be attached to a vehicle on the construction site, and information about the location of the vehicle may be provided by the second computing device. Similarly, a person at the construction site may be carrying a computing device supplying location information to a person at a different location. The two may be communicating over a video, telephone or text link, while information about the location of the person on the site is communicated to a person viewing information about the construction project at a different location.

In an embodiment of the invention, information about the actual progress of the construction project is received. Information about the progress of the construction project may include information about money spent, information about complete construction activity, information about hours worked, information by materials delivered to the site, and a number of other types of information including logistical info.

In an embodiment of the invention, a user can provide an indication that the actual progress of the construction project differs from the expected progress. For example, the computing device may display a rendering of the expected construction progress for a room. The rendering may include carpeting on the floor, and crown moldings. The user may indicate by clicking on the display that the crown moldings have been installed, but that the carpet has not been installed. FIG. 4 shows an embodiment of the invention including the ability to report that an inconsistency between planned progress of a construction project and actual progress of a construction project. The "Report Inconsistency" button 403 allows a user to indicate that the scheduled dates were not met or that there were other issues relating to the component or milestone. There are a number of ways a user could indicate that the actual progress differs from the expected progress. In one embodiment, the user may do so by indicating the number of workers present at a particular site, the amount of money spent, or any other metric relating to the project. The information about the actual progress of the project may also be received from an automated data source, such as logistical information from a shipping company, digital bank statements received from a bank, vehicle tracking data from a tracking device or information from an access card system used to control access to the construction site.

Figure 6:
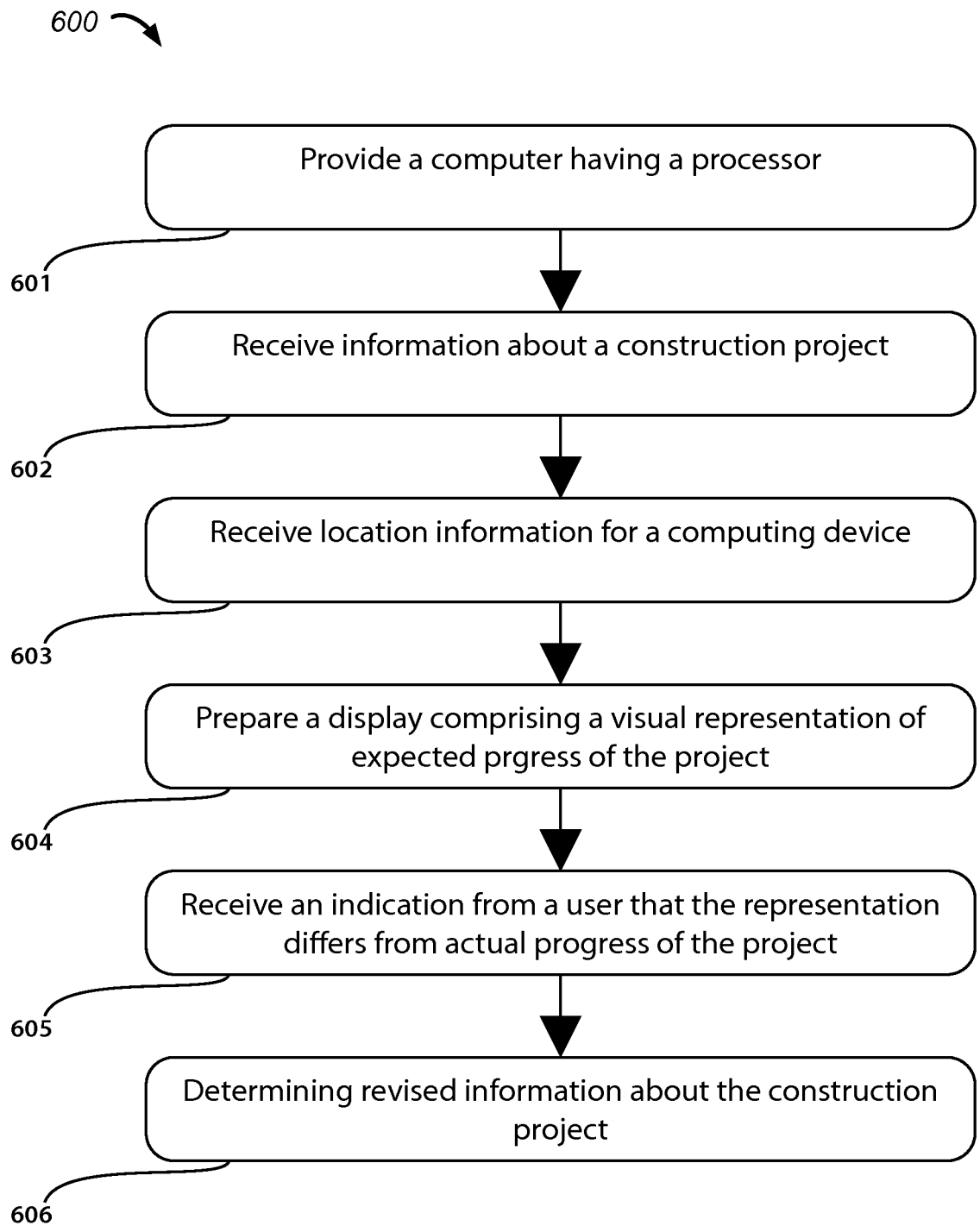
FIG. 6 is a high-level flowchart illustrating a method for monitoring construction according to an embodiment of the present invention.

FIG. 6 is a simplified flowchart illustrating a method of monitoring construction according to an embodiment of the present invention. The method 600 includes providing a computer having a processor (601) and receiving information about a construction project (602). In an embodiment of the invention, the information is received over a network connection. Furthermore, the method includes receiving location information for a computing device (603). The computing device may include a location sensor. The computing device may be the same computing device receiving the information about the construction project, or a different one. The method further includes preparing a display comprising a visual representation of expected progress of the construction project (604). An indication may then be received from a user that the representation differs from the actual progress (605). The indication may comprise user-input on a touch display, or in a number of other ways. In response to the input, revised information about the construction project may be determined (606).

It should be appreciated that the specific steps illustrated in FIG. 6 provide a particular method of monitoring construction according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
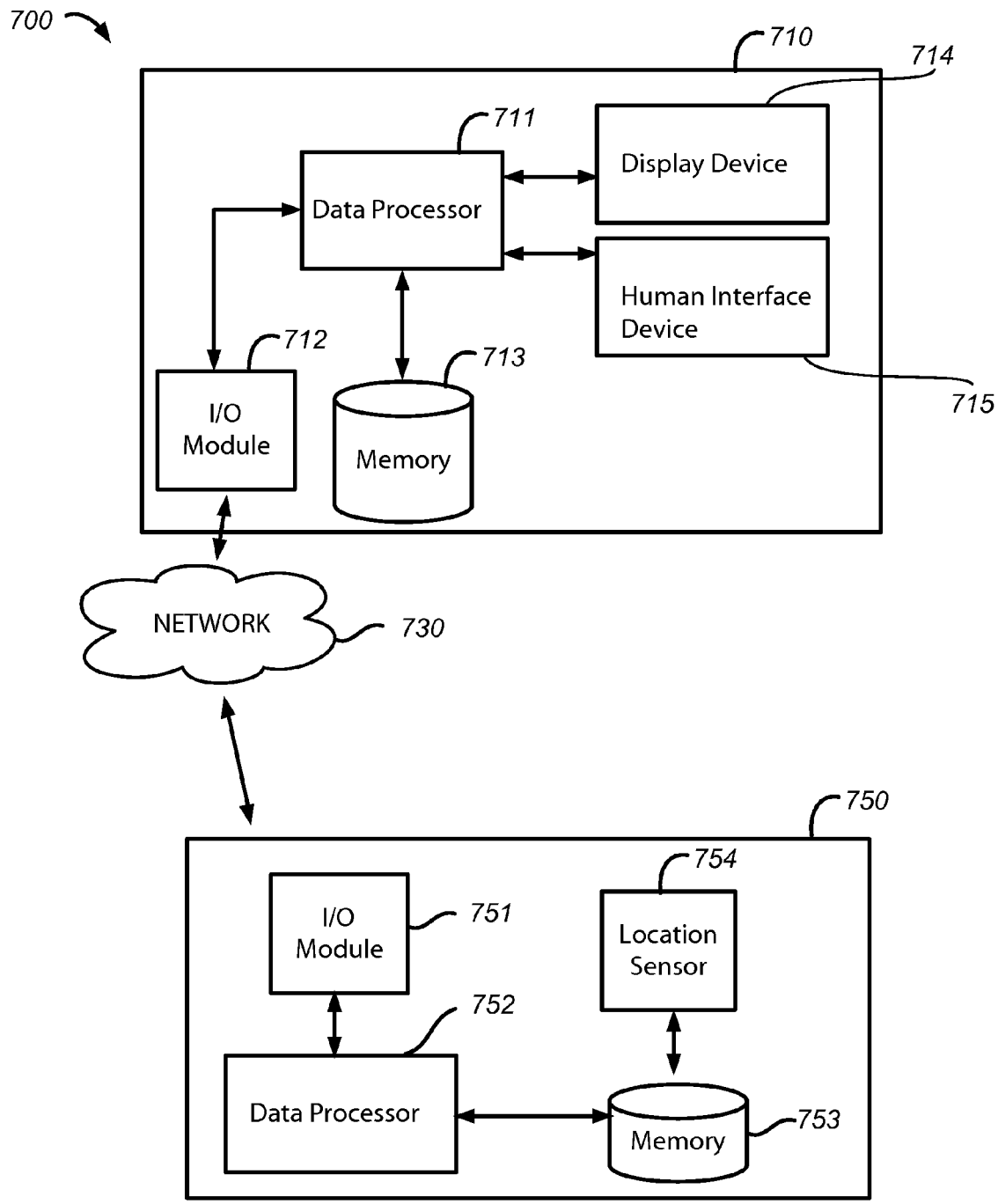
FIG. 7 is a high-level schematic diagram illustrating a system for monitoring and tracking the progress of a construction project according to an embodiment of the present invention.

FIG. 7 is a simplified schematic diagram of a system for monitoring construction according to an embodiment of the present invention. As illustrated in FIG. 7 a user operating user computer 710 interacts with a location tracking computer 750. User computer 710 can include one of many types of computing devices including, without limitation, a personal computer, a laptop computer, a notebook computer, a tablet computer, a handheld mobile device, a PDA, a mobile phone, or the like. The user computer 710 includes a data processor 711, a memory 713, a display device 714 and a human interface device 715. The human interface device may include a touch sensor that is integrated with the display device. The human interface device may also include a microphone, keyboard, mouse or other device. The user computer also includes an I/O module that may be used to communicate with the location tracking computer and/or a data source.

The location tracking computer 750 includes a data processor 752, also referred to as a processor, and a memory 753. The location-tracking computer further includes a location sensor 754. The location sensor may include a GPS module. The location tracking computer further includes an I/O module 751. The I/O module may include a cellular data modem, a WiFi interface or other device.

Figure 8:
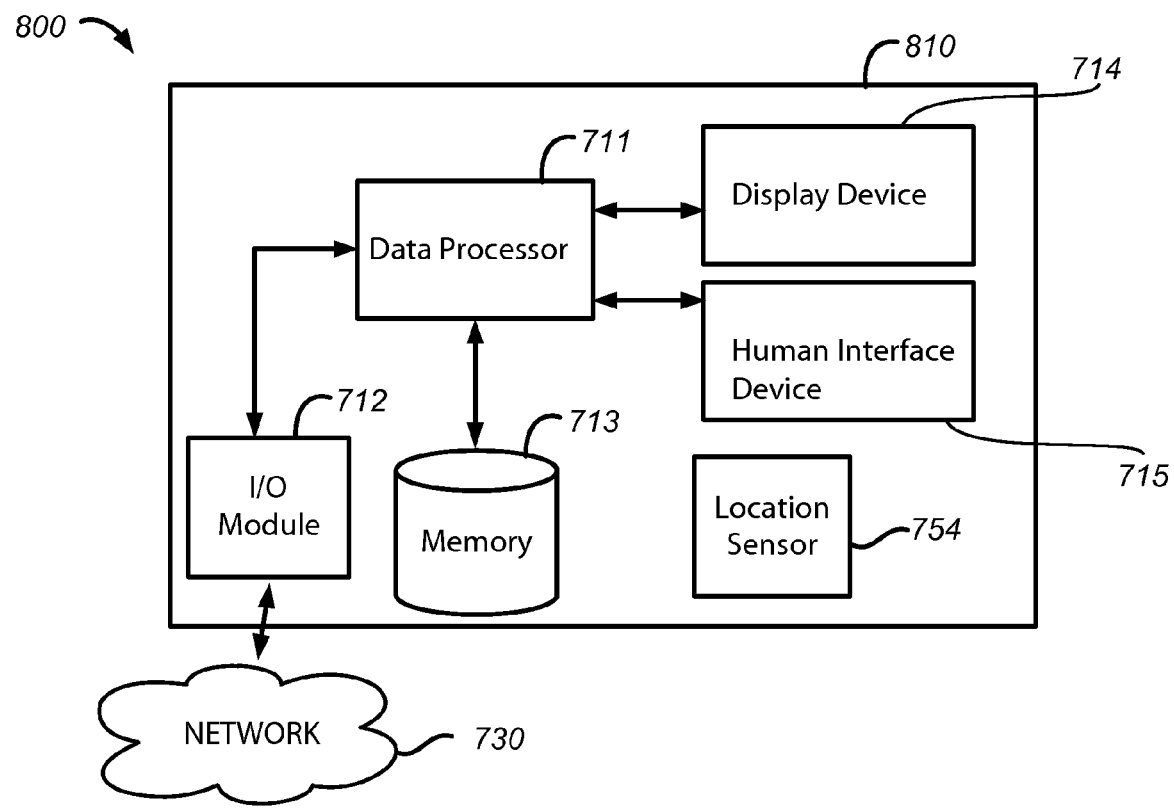
FIG. 8 is a high-level schematic diagram illustrating a system for monitoring and tracking the progress of a construction project according to an embodiment of the present invention.

FIG. 8 is a simplified schematic diagram of a system for monitoring construction according to an embodiment of the present invention. FIG. 8 shows a user operating computer 810 including a location sensor 754. As the user operating computer in FIG. 7, it includes 710 includes a data processor 711, a memory 713, a display device 714 and a human interface device 715. However, since it includes a location sensor it does not need to rely on a second computer for location information. The location sensor may include a GPS receiver, but can also comprise a touch screen allowing the user to select a location, or any other means of providing location information.

In an embodiment of the invention, a user computer with an embedded location sensor 810 may be used in conjunction with one or more location tracking computers 750 to provide multiple sources of location data.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer implemented method for monitoring construction, the method comprising:
   receiving, via a processor, information about a construction project, the information comprising:
   information about construction milestones;
   schedule information about the construction milestones, the schedule information identifying expected construction activity at a particular time for each construction milestone; and
   graphical data related to the construction milestones and the schedule information;

receiving location information for a computing device, the location information representing a location of the computing device;

based on the location information and the information about the construction project, generating, using the processor, a display comprising:

a visual representation of expected progress of the construction project, the visual representation including a perspective view representation of the construction project from a perspective of the location of the computing device; and information about expected activity related to the construction project for a period of time;

receiving an input from a user of the computing device, the input indicating that the visual representation of the expected progress differs from actual progress of the construction project, the actual progress including one or more construction activities, and the input representing that the one or more construction activities have not been completed in accordance with the schedule information; and determining, via the processor, revised information about the construction project, wherein the method includes the processor generating different perspective view representations of the construction project based on different location information representing different locations of the computing device.

2. The method of claim 1 wherein the schedule information comprises information about the expected construction activity including at least one of: equipment in use at a particular time; and materials used at a particular time.

3. The method of claim 1 wherein the schedule information comprises one or more of: number of persons present at a particular time; money spent by a particular time; and man hours worked by a particular time.

4. The method of claim 1 wherein the location information for a computing device comprises GPS coordinates of the computing device.

5. The method of claim 1 wherein the location information for a computing device comprises an indication from a user on a touch screen.

6. The method of claim 1 wherein the visual representation of the expected progress of the project comprises a Gantt chart.

7. The method of claim 1 wherein the visual representation of the expected progress of the project comprises:

a three-dimensional graphical representation of the expected appearance of the construction site; and indicators showing differences between the actual progress of the construction site and the expected progress of the construction site.

8. The method of claim 1 further comprising receiving additional information about the actual progress of the project by receiving one or more of the following:

financial projections;
data from an access card system;
data from a vehicle tracking device;
logistical tracking data; and
imaging data.

9. A non-transitory computer-readable storage medium comprising a plurality of computer-readable instructions tangibly embodied on the computer-readable storage medium, which when executed by a data processor, provide a timeline-based visual dashboard for construction, the plurality of instructions comprising:

instructions that cause the data processor to receive information about a construction project comprising: information about construction milestones; schedule information about the construction milestones; and graphical data related to the construction milestones and the schedule information;

instructions that cause the data processor to receive location information corresponding to a location of a computing device;

instructions that cause the data processor to, based on the location information and the information about the construction project, prepare a display comprising: a visual representation of expected progress of the project; and information about expected activity related to the project for a period of time;

instructions that cause the data processor to receive an indication from a user that the representation of the expected progress differs from actual progress of the project; and instructions that cause the data processor to determine revised information about the construction project, wherein the visual representation of expected progress of the project includes a perspective view representation of the construction project from a perspective of the location of the computing device, and the instructions that cause the data processor to generate the display include instructions for generating different perspective view representations of the construction project based on different location information representing different locations of the computing device.

10. The non-transitory computer-readable storage medium of claim 9 wherein the schedule information comprises information about expected construction activity including at least one of: equipment in use at a particular time; and materials used at a particular time.

11. The non-transitory computer-readable storage medium of claim 9 wherein the schedule information comprises one or more of: number of persons present at a particular time; money spent by a particular time; and man hours worked by a particular time.

12. The non-transitory computer-readable storage medium of claim 9 wherein the visual representation of the expected progress of the project comprises a Gantt chart.

13. The non-transitory computer-readable storage medium of claim 9 wherein the visual representation of the expected progress of the project comprises:

a three-dimensional graphical representation of the expected appearance of the construction site;

indicators showing differences between the actual progress of the construction site; and the expected progress of the construction site.

14. The non-transitory computer-readable storage medium of claim 9 further comprising:

instructions that cause the data processor to receive additional information about the actual progress of the project by receiving one or more of the following:

financial projections;
data from an access card system;
data from a vehicle tracking device;
logistical tracking data; and
imaging data.

15. A system for monitoring and tracking the progress of a construction project, comprising:

a processor;
a memory disposed in communication with the processor and storing processor executable instructions, the instructions comprising instructions for:

receiving information about a construction project comprising:
  information about construction milestones;
  schedule information about the construction milestones; and
  graphical data related to the construction milestones and the schedule information;
receiving location information corresponding to a location of a computing device;
based on the location information and the information about the construction project, preparing, using the processor, a display comprising:
  a visual representation of expected progress of the project; and
  information about expected activity related to the project for a period of time;
receiving an indication from a user that the representation of the expected progress differs from actual progress of the project; and
determining revised information about the construction project,
wherein the visual representation of expected progress of the project includes a perspective view representation of the construction project from a perspective of the location of the computing device, and
the system is further configured to generate different perspective view representations of the construction project based on different location information representing different locations of the computing device.

16. The system of claim 15 wherein the schedule information comprises information about expected construction activity including at least one of: equipment in use at a particular time; and materials used at a particular time.

17. The system of claim 15 wherein the schedule information comprises one or more of: number of persons present at a particular time; money spent by a particular time; and man hours worked by a particular time.

18. The system of claim 15 wherein the visual representation of the expected progress of the project comprises a Gantt chart.

19. The system of claim 15 wherein the visual representation of the expected progress of the project comprises:
  a three-dimensional graphical representation of the expected appearance of the construction site;
  indicators showing differences between the actual progress of the construction site; and the expected progress of the construction site.

20. The system of claim 15 wherein the instructions further comprise instructions for receiving additional information about the actual progress of the project by receiving one or more of the following:
  financial projections;
  data from an access card system;
  data from a vehicle tracking device;
  logistical tracking data; and
  imaging data.

21. The method of claim 1, wherein a perspective of the visual representation of the expected progress of the project is determined using the location information.

22. The method of claim 1, further comprising:
  dynamically updating the visual representation of the expected progress of the construction project based on a changed location of the computing device, wherein dynamically updating the visual representation includes modifying the perspective view representation in accordance with the changed location.

* * * * *